United States Patent [19]
Morishita et al.

[11] Patent Number: 5,956,956
[45] Date of Patent: Sep. 28, 1999

[54] CRYOGENIC REFRIGERATOR

[75] Inventors: Hiroyuki Morishita; Hirotoshi Torii, both of Osaka, Japan

[73] Assignee: Daikin Industries, Ltd., Osaka, Japan

[21] Appl. No.: 08/945,029

[22] PCT Filed: Feb. 21, 1997

[86] PCT No.: PCT/JP97/00484

§ 371 Date: Oct. 21, 1997

§ 102(e) Date: Oct. 21, 1997

[87] PCT Pub. No.: WO97/31228

PCT Pub. Date: Aug. 28, 1997

[30] Foreign Application Priority Data

Feb. 21, 1996 [JP] Japan ................................. 8-034008
Nov. 13, 1996 [JP] Japan ................................. 8-301979

[51] Int. Cl.⁶ ........................................... F25B 9/00
[52] U.S. Cl. ........................ 62/6; 277/465; 277/553; 277/560
[58] Field of Search .................. 62/6; 251/174; 277/465, 553, 560

[56] References Cited

U.S. PATENT DOCUMENTS

| | | | |
|---|---|---|---|
| 1,963,849 | 6/1934 | Johnson | 277/553 |
| 3,127,185 | 3/1964 | Evans | 277/553 |
| 3,364,675 | 1/1968 | Dorer | 62/6 |
| 3,396,976 | 8/1968 | Reinhoudt et al. | 277/465 |
| 3,847,389 | 11/1974 | Rogers | 277/553 |
| 3,861,691 | 1/1975 | Wheeler | 277/553 |
| 4,143,883 | 3/1979 | Paynter | 277/553 |
| 4,355,519 | 10/1982 | Kercheval et al. | 62/6 |
| 4,501,120 | 2/1985 | Holland | 62/6 |
| 4,830,344 | 5/1989 | Balsells | 277/553 |
| 5,265,890 | 11/1993 | Balsells | 277/553 |

FOREIGN PATENT DOCUMENTS

| | | |
|---|---|---|
| 3-37367 | 4/1991 | Japan . |
| 4-320766 | 11/1992 | Japan . |
| 5-180524 | 7/1993 | Japan . |
| 7-019638 | 1/1995 | Japan . |

*Primary Examiner*—Ronald Capossela
*Attorney, Agent, or Firm*—Birch, Stewart, Kolasch & Birch, LLP

[57] ABSTRACT

Occurrence of leakage of refrigerant around a seal member in cryogenic state is suppressed. The seal member 32 is formed from unsaturated polyester-PTFE with an unsaturated polyester mixing ratio of 20% to 35%. A plurality of slits 36 extended axially and penetrating through radially are provided in an end portion 35 of an outer circumferential wall 32a. Thus, by a synergistic effect of the use of a material small in the heat shrinkage factor and the reduction of radial shrinkage of the whole outer circumferential wall 32a attributable to the aforementioned configuration, the sealing properties in the cryogenic state are enhanced so that the occurrence of leakage of refrigerant is suppressed to the utmost, thereby preventing deterioration in the refrigeratability.

11 Claims, 5 Drawing Sheets

CRYOGENIC REFRIGERATOR

TECHNICAL FIELD

The present invention relates to a cryo-refrigerator in which a spacing between an outer circumferential surface of a displacer and an inner circumferential surface of a cylinder is sealed by a seal ring.

BACKGROUND ART

Conventionally, there has been provided a cryo-refrigerator employing a magnetic regenerative material as shown in FIG. 7.

This cryo-refrigerator comprises a first displacer 3 which has a first chamber with an unshown regenerative material accommodated therein and which is reciprocatably fitted in a first cylinder 1, and a second displacer 7 which has a second chamber communicating with the first chamber and accommodating an unshown regenerative material and which is reciprocatably fitted in a second cylinder 5. Then, the first chamber of the first displacer 3 is switchedly communicated with a high-pressure chamber 12 having an inlet 11 or with a low-pressure chamber 14 having an outlet 13, via a valve stem 9 and a valve 10.

The communicating path from the first chamber to either the high-pressure chamber 12 or the low-pressure chamber 14 is switched over by rotating the valve 10 with a synchronous motor 15.

The cryo-refrigerator having the above constitution operates as follows.

Referring to FIG. 7, a high-pressure refrigerant gas fed from a compressor (not shown) or the like is introduced into the first chamber of the first displacer 3 from the inlet 11 via the valve 10 and the valve stem 9, where the refrigerant gas undergoes heat exchange with the regenerative material within the first chamber, thus being cooled (first stage). The refrigerant gas cooled in this way is further introduced into the second chamber within the second displacer 7, where the refrigerant gas undergoes heat exchange with the regenerative material within the second chamber, thus being further cooled (second stage).

After these processes, the valve 10 is rotated by the synchronous motor 15, so that the first chamber is communicated with the low-pressure chamber 14. Then, the high-pressure refrigerant gas that has been introduced in the first chamber and the second chamber is expanded at a breath, lowering in gas temperature. In this way, the low temperature obtained by the expansion of the refrigerant gas is kept by the regenerative material.

As described above, a cryogenic temperature is obtained by iterating the introduction of the high-pressure refrigerant gas into the first chamber and the second chamber as well as its expansion (i.e., by iterating the refrigerating cycle).

Between the second displacer 7 side and the valve stem 9 side in the first cylinder 1, there occurs a pressure difference during the refrigerating cycle. Likewise, a pressure difference occurs between the terminal end side and the first displacer 3 side in the second cylinder 5 while the refrigerating cycle is performed. Therefore, a circular seal ring 21 is attached at a step portion 20 provided in an upper outer circumferential surface of the first displacer 3, thereby sealing between the inner circumferential surface of the first cylinder 1 and the outer circumferential surface of the first displacer 3. Likewise, a circular seal ring 23 is attached at a step portion 22 provided in an upper outer circumferential surface of the second displacer 7, thereby sealing between the inner circumferential surface of the second cylinder 5 and the outer circumferential surface of the second displacer 7.

FIG. 8 is a detailed sectional view of the seal ring 21. The seal ring 21 comprises a seal member 26 formed into a U shape in cross section and having an annular groove 25 opened upward, and an annular coil spring 27 fitted into the annular groove 25 of the seal member 26. Then, an outer circumferential wall 26a of the seal member 26 is biased outward by the coil spring 27, so that the sealing portion of the outer circumferential wall 26a is put into close contact with an inner circumferential surface 1a of the first cylinder 1, by which the spacing between the first cylinder 1 and the first displacer 3 is sealed.

In this arrangement, the outer circumferential wall 26a of the seal member 26 is convexly bent radially outward with an upper portion 28 bent inward so that the spring 27 fitted in the annular groove 25 will not leap out. Thus, the sealing portion is formed by a radially outer end of the bend of the outer circumferential wall 26a.

In addition, the seal ring 23 has a similar arrangement.

However, the conventional seal ring 21 as described above has the following problem.

That is, when the temperature in the first cylinder 1 comes to a cryogenic temperature through iterations of the refrigerating cycle as described above, the seal member 26 is exposed to an atmosphere of cryogenic temperature such that the outer circumferential wall 26a undergoes heat shrinkage. Then, the outermost diameter of the seal member 26 (i.e., outer diameter of the sealing portion) becomes so small that flow-by occurs, with the result of lowered refrigeratability.

It is therefore an object of the present invention to provide a cryo-refrigerator having a seal ring which suppresses the occurrence of flow-by in the cryogenic state to thereby prevent deterioration of the refrigeratability.

DISCLOSURE OF THE INVENTION

In order to achieve the aforementioned object, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges outer circumferential wall of the seal member radially outward, characterized in that the seal member is formed from unsaturated polyester-polytetrafluoroethylene in which unsaturated polyester mixing ratio satisfies that 20% ≦ mixing ratio ≦ 35%.

With this constitution, the seal member for sealing between the outer circumferential surface of the displacer and the inner circumferential surface of the system is formed from unsaturated polyester-polytetrafluoroethylene with an unsaturated polyester mixing ratio of 20% or more. Therefore, the heat shrinkage factor of the seal member is small and, as a result, the occurrence of leakage of refrigerant around the seal member is reduced extremely, so that the cryo-refrigerator employing this seal member exhibits a high refrigeratability. If the unsaturated polyester mixing ratio is lower than 20%, the heat shrinkage factor of the seal member would become large and, as a result, the sealing properties at cryogenic temperature would deteriorate. Also, the seal member is formed with good processability from unsaturated polyester-polytetrafluoroethylene with an unsaturated polyester mixing ratio of 35% or lower. If the unsaturated polyester mixing ratio exceeds 35%, the processability would deteriorate.

Also, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, characterized in that an outer circumferential surface of the outer circumferential wall of the seal member is convexly bent in an axial cross section, and a radial outer end portion of the bent convex portion forms a sealing portion, and that a slit arranged axially and penetrating through radially is provided in a portion of the outer circumferential wall nearer to opening of the annular groove than the sealing portion.

With this constitution, if the atmosphere of the seal member comes to a cryogenic temperature of around 20 K, the seal member yields heat shrinkage. When this occurs, circumferential heat shrinkage that occurs to the opening side from the sealing portion in the outer circumferential wall of the seal member is absorbed by the presence of the slits. Thus, radial heat shrinkage of the outer circumferential wall as a whole is reduced, so that occurrence of flow-by is suppressed.

Also, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, characterized in that an outer circumferential surface of an outer circumferential wall of the seal member is convexly bent in an axial cross section, and a radial outer end portion of the bent convex portion forms a sealing portion, and that annular grooves are provided at at least one of the sealing portion of the outer circumferential wall and a site opposite to the sealing portion in an inner circumferential surface of the outer circumferential wall.

With this constitution, since a groove extending circumferentially is provided at the sealing portion in the outer circumferential wall of the seal member or a site opposite to the sealing portion in the inner circumferential surface, the thickness of the sealing portion in the outer circumferential wall is thin. As a result, the force of radial heat shrinkage at the sealing portion in the outer circumferential wall becomes small, so that the force of radially tightening the spring becomes small. Thus, the radial heat shrinkage of the outer circumferential wall is reduced so that the occurrence of leakage flow around the seal member is suppressed.

Also, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, characterized in that an outer circumferential surface of the outer circumferential wall of the seal member is inclined with respect to the axial direction in such a manner that a radius of the outer circumferential surface progressively increases toward one end of the axial direction, and an end portion of the outer circumferential wall forms a sealing portion;

a structural member protruding radially outward is provided on axial one side of the displacer beyond the position of the seal member;

a protrusion protruding toward the seal member is provided outside the spring in an end face of the structural member confronting the spring; and the spring fitted in the seal member is prevented from leaping out by the end face of the structural member and the protrusion.

With this constitution, no portion that is bent radially inward to prevent the spring from leaping out is provided on the opening side with respect to the sealing portion in the outer circumferential wall of the seal member. Therefore, radial heat shrinkage of the whole outer circumferential wall is reduced so that the occurrence of leakage flow passing by the seal member is suppressed. Further, in the leaping-out direction of the spring, the structural member provided so as to protrude from the displacer and the protrusion provided at an end face of the structural member confronting the spring are present, by which the spring is prevented from leaping out.

Also, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, characterized in that the seal member is implemented by a plurality of seal members stacked in an axially same direction;

outer circumferential surfaces of the outer circumferential walls of the respective seal members are inclined with respect to the axial direction in such a manner that radii of the outer circumferential surfaces progressively increase toward one end of the axial direction, and an end portion of each outer circumferential wall forms a sealing portion;

a protrusion protruding downward is provided at the other axial end portion of the outer circumferential wall of the seal member on the one axial end side out of the seal members; and the spring fitted in the seal member located on the other axial end side is prevented from leaping out by both the other axial end portion of the seal member located on the one axial end side and the protrusion.

With this constitution, on the opening side from the sealing portion in the outer circumferential wall of each of the stacked seal members, there is present no portion that is bent radially inward to prevent the spring from leaping out. Therefore, radial heat shrinkage of the whole outer circumferential wall is reduced so that the occurrence of leakage flow is suppressed. Further, in the leaping-out direction of the spring fitted to the other axial end side, the other axial end portion of the seal member on the one axial end side as well as the protrusion provided at the other axial end portion of the outer circumferential wall in the seal member are present, by which the spring is prevented from leaping out.

Also, according to the present invention, there is provided a cryo-refrigerator having: a cylinder; a displacer which is reciprocatably fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, characterized in that height (f) of the outer circumferential wall of the seal member is shorter than height (e) of the inner circumferential wall, and wherein the spring is partly protruded from an end of the outer circumferential wall.

With this constitution, height (i.e., length) of the outer circumferential wall from the bottom of the annular groove of the seal member is shorter than the length of the inner circumferential wall, and the annular spring is partly protruded from the end of the outer circumferential wall. Therefore, the outer circumferential wall will not press the whole spring inward of the radial direction (i.e., the pressing force of the outer circumferential wall against the spring is relatively small), so that the repulsion force of the spring will never be deteriorated. If the outer circumferential wall and the inner circumferential wall are of the same height, there is a possibility that the repulsion force of the spring may be deteriorated, in which case the end portion of the outer circumferential wall would no longer exert the sealing function.

BEST MODE FOR CARRYING OUT THE INVENTION

Figure 7:
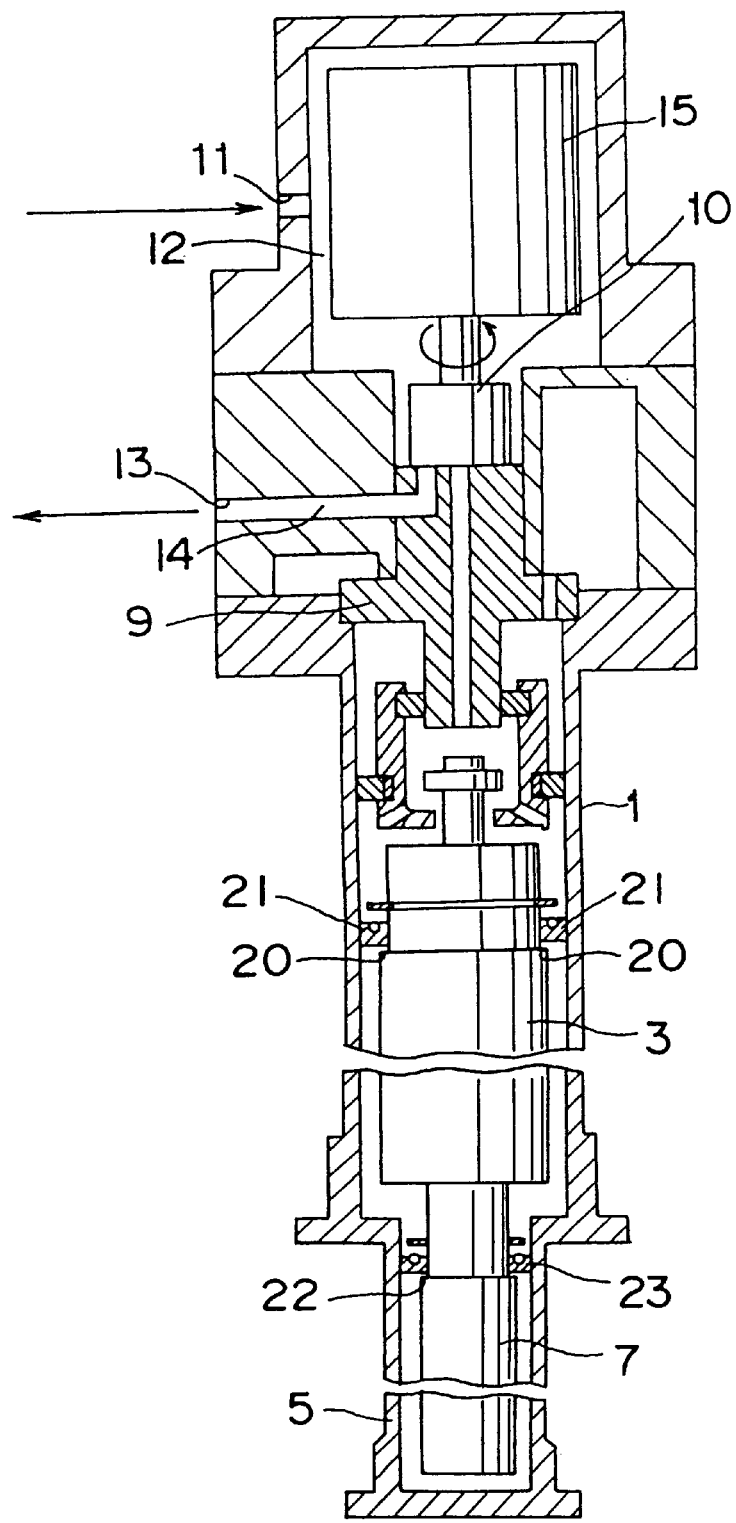
FIG. 7 is a sectional view of a cryo-refrigerator.

The present invention will now be described by way of embodiments as illustrated in the accompanying drawings. These embodiments are similar in construction to the prior art example of FIG. 7 except for a seal member and members therearound. Therefore, emphasis will be placed on the seal member in the following description.

Figure 1:
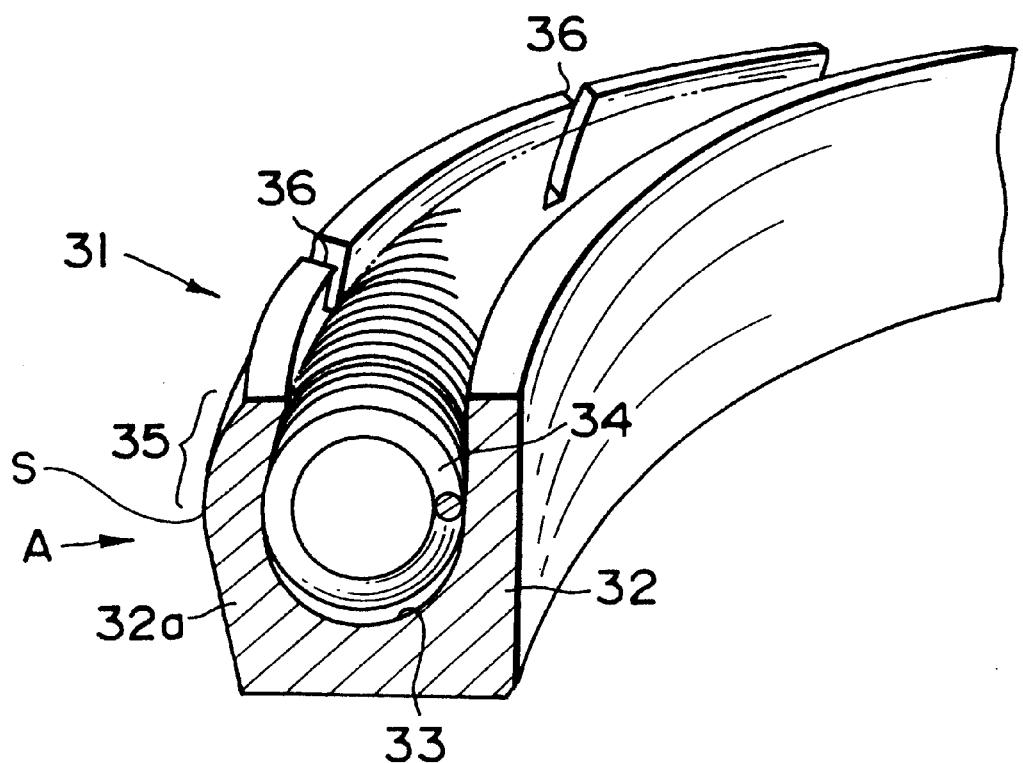
FIG. 1 is a perspective view in cross section showing an embodiment of a seal ring in a cryo-refrigerator of the present invention.

FIG. 1 is a perspective view in cross section of a seal ring to be used in a cryo-refrigerator of this embodiment. This seal ring is the only difference from the prior art example of FIG. 7.

A seal ring 31 in this embodiment comprises a seal member 32 having an annular groove 33 opened upward in the figure, and an annular coil spring 34 fitted into the annular groove 33 of the seal member 32. Also, the seal member 32 in this embodiment is formed from a mixture of polytetrafluoroethylene and unsaturated polyester (hereinafter, referred to as unsaturated polyester-PTFE) As in the conventional seal member 26 shown in FIG. 8, an outer circumferential surface of an outer circumferential wall 32a of the seal member 32 is convexly bent in axial cross section, and an end in a radial direction of this bent convex portion forms a sealing portion S.

Figure 8:
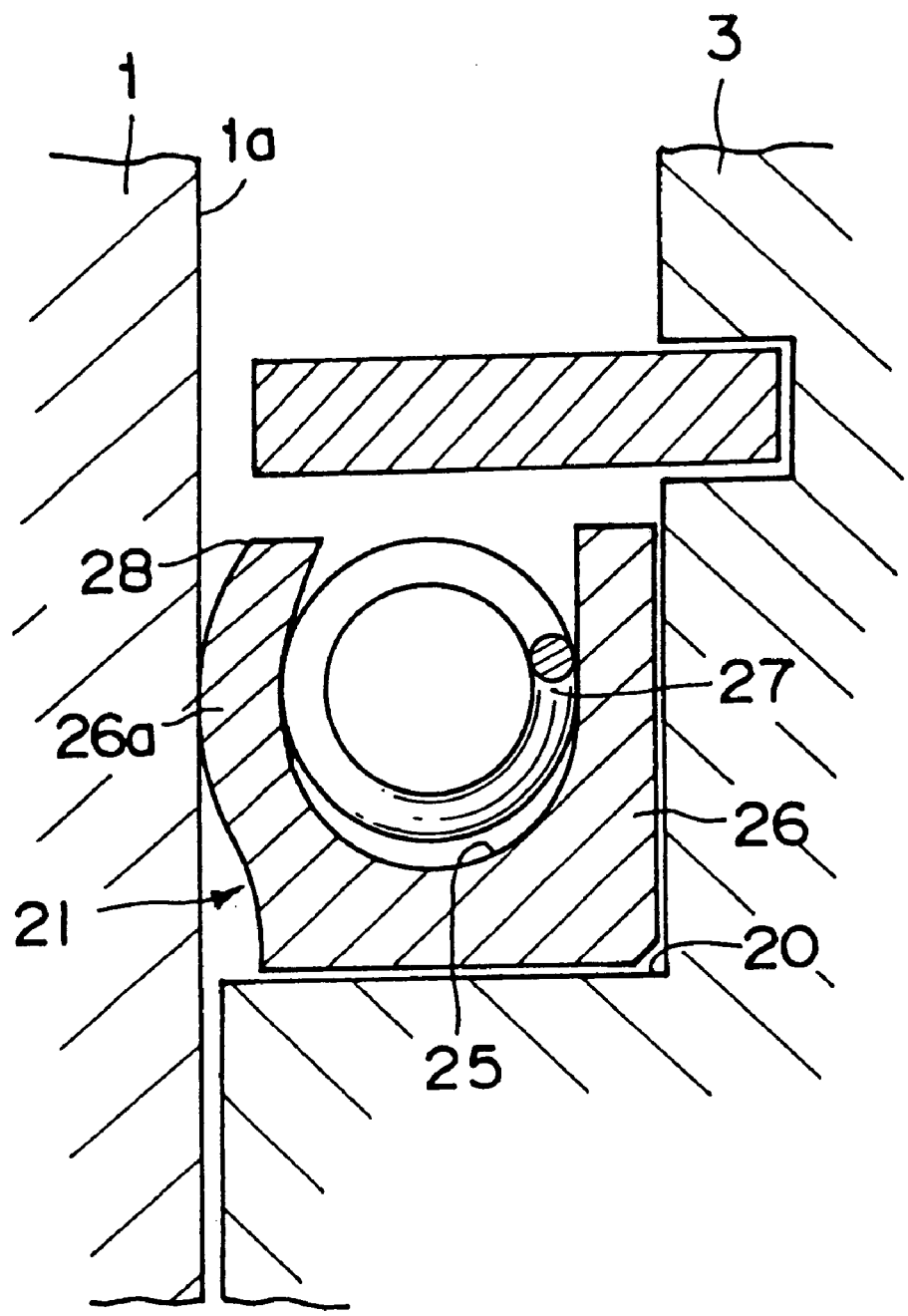
FIG. 8 is a detailed sectional view of a conventional seal ring in FIG. 7.

The seal member 32 and the spring 34 with the above constitution function in the same manner as the conventional seal member 26 and spring 27 shown in FIG. 8, thus sealing between the inner wall surface of the first cylinder or the second cylinder and the first displacer or the second displacer.

PTFE has a small heat shrinkage factor, and in particular, unsaturated polyester-PTFE shows a heat shrinkage factor smaller than that of carbon-PTFE. Accordingly, the unsaturated polyester-PTFE is optimal as the material of the seal member 32 in the seal ring 31 which is used under a cryogenic atmosphere of around 20 K.

Figure 3:
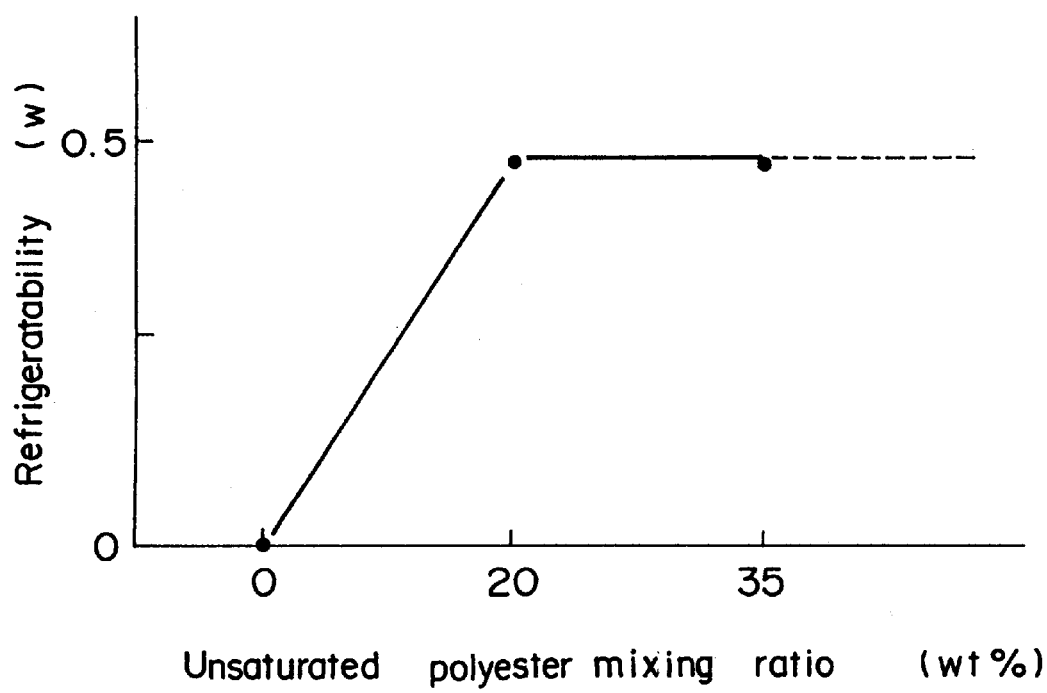
FIG. 3 is a chart of relationship between unsaturated polyester filling rate and refrigeratability in unsaturated polyester-PTFE.

The unsaturated polyester-PTFE differs in heat shrinkage factor depending on the mixing ratio of unsaturated polyester, the relationship between unsaturated polyester mixing ratio and refrigeratability being as shown in FIG. 3. Therefore, if the unsaturated polyester mixing ratio is 20% or more, the material of the seal member 32 becomes small in heat shrinkage factor, improved in sealing properties and high in refrigeratability. However, if the unsaturated polyester mixing ratio exceeds 35%, the material would become so fragile as to yield cracks, incapable of forming the seal member 32. Accordingly, it follows that an unsaturated polyester-PTFE which satisfies that $20\% \leq$ unsaturated polyester mixing ratio $\leq 35\%$ is optimal for the material of the seal member 32.

Figure 2:
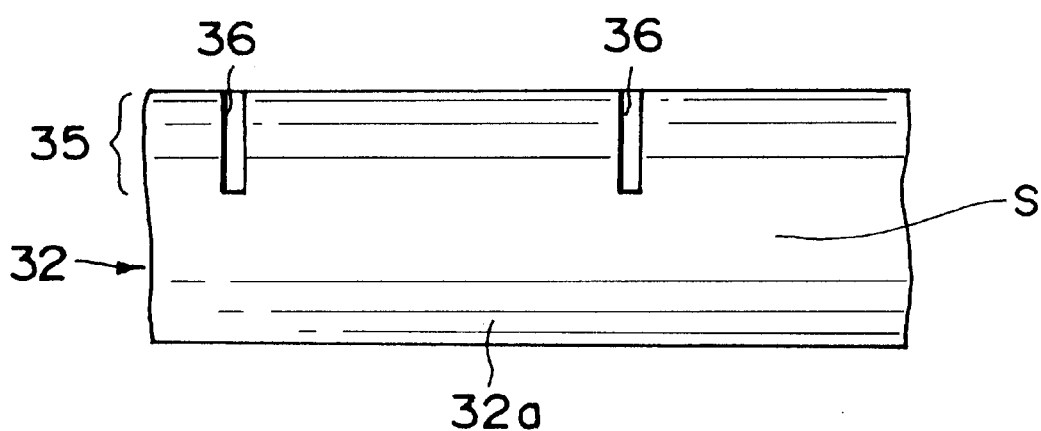
FIG. 2 is a side view of FIG. 1 as viewed along an arrow A.

FIG. 2 is a side view of FIG. 1 as viewed along the arrow A. In a portion 35 upper than the sealing portion of the outer circumferential wall 32a of the seal member 32 of this embodiment, as viewed in the figure (hereinafter, referred to simply as upper portion), a plurality of slits 36 are provided so as to be arrayed along the axial direction and cut through along the radial direction. With this arrangement, when the atmosphere of the seal member 32 reaches a cryogenic temperature of around 20 K such that the outer circumferential wall 32a of the seal member 32 yields heat shrinkage, circumferential heat shrinkage that occurs to the upper portion 35 is absorbed by the presence of the slits 36. As a result, radial shrinkage of the outer circumferential wall 32a as a whole is reduced so that occurrence of leakage of the refrigerant around the seal member 32 can be suppressed to the utmost.

As described above, the seal member 32 of the seal ring 31 in this embodiment is formed from an unsaturated polyester-PTFE with the unsaturated polyester mixing ratio of 20% to 35%, and a plurality of slits 36 arrayed along the axial direction and cut through along the radial direction are provided in the upper portion 35 of the outer circumferential wall 32a of the seal member 32. Accordingly, by a synergistic effect of the use of a material small in the heat shrinkage factor and the reduction of radial shrinkage of the whole outer circumferential wall 32a attributable to the aforementioned configuration, the sealing properties in the cryogenic state are enhanced so that the occurrence of leakage of refrigerant can be suppressed to the utmost, and that deterioration in the refrigeratability can be prevented.

It is needless to say that the effect of enhancing the sealing properties in the cryogenic state can be obtained by only either one of implementing the material of the seal member 32 with an unsaturated polyester-PTFE having an unsaturated polyester mixing ratio of 20% to 35% or providing the slits 36 in the upper portion 35 of the outer circumferential wall 32a in the seal member 32. Also, the slit 36 to be provided in the upper portion 35 of the outer circumferential wall 32a has only to be one or more.

Figure 4:
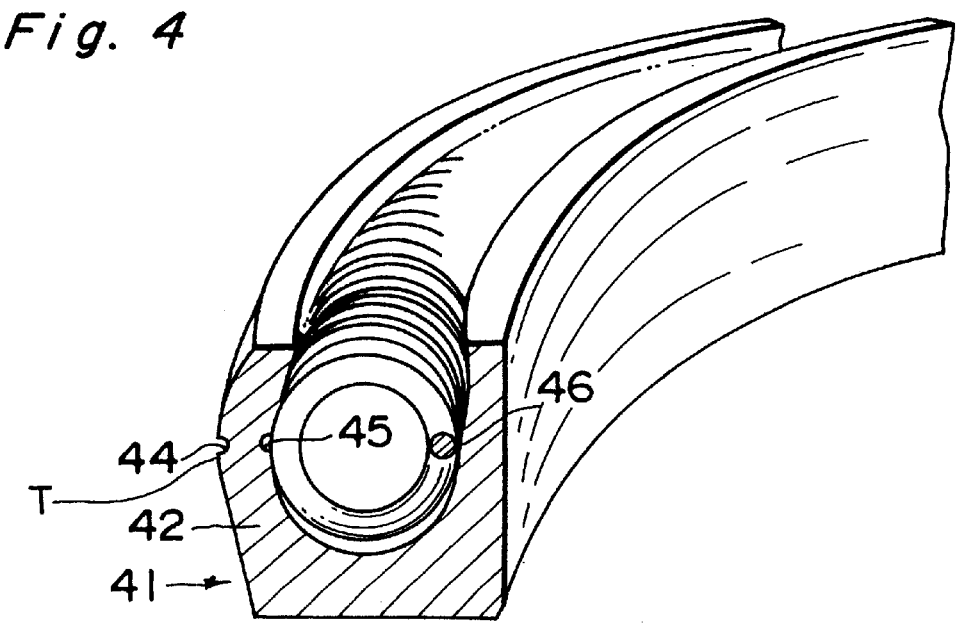
FIG. 4 is a perspective view in cross section of a seal ring different from that of FIG. 1.

FIG. 4 is a view showing another example of such a configuration that radial heat shrinkage of the seal member is reduced.

In a seal member 41 shown in FIG. 4, grooves 44, 45 extending circumferentially are provided at a sealing portion T, which is an outer end portion in a radial direction of the convex portion of the outer circumferential surface of an outer circumferential wall 42, and at a site in the inner circumferential surface opposite to the aforementioned sealing portion T. With this arrangement, the radial length (thickness) of the outer circumferential wall 42 in proximity to the sealing portion T is reduced so that the force of radial heat shrinkage is lessened and therefore that the force of radially tightening a spring 46 is lessened. Therefore, the force of radial heat shrinkage of the sealing portion T in the outer circumferential wall 42 at cryogenic temperature is reduced so that the sealing properties are enhanced and that the occurrence of leakage of refrigerant can be suppressed to the utmost.

In addition, the above effects can be produced even with the provision of either one of the grooves 44, 45 to be provided in the lip portion and the inner circumferential surface.

Figure 5:
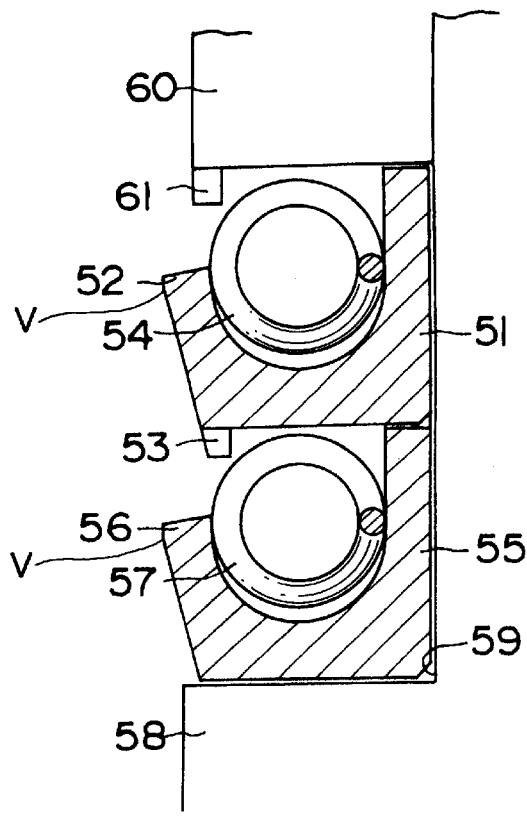
FIG. 5 is a sectional view of a seal ring different from those of FIGS. 1 and 4.

FIG. 5 is a view showing another example of such a configuration that radial heat shrinkage of the seal member is reduced.

In seal members 51, 55 shown in FIG. 5, upper part in the figure is deleted with sealing portions V in outer circumferential walls 52, 56 left, by which radial heat shrinkage of the whole outer circumferential walls 52, 56 is reduced so that the occurrence of leakage of refrigerant is suppressed to the utmost.

With such a configuration adopted, however, there is provided no member for preventing springs 54, 57 fitted in the seal members 51, 55 from leaping out. Therefore, when a plurality of seal rings are used as stacked on a step portion 59 of a displacer 58 as shown in FIG. 5, a protrusion 53 protruding downward is provided at a lower end portion of the outer circumferential wall 52 in the seal member 51 located above the lower seal member 55. Then, by both the bottom of the seal member 51 located on the upper side and the protrusion 53, the spring 57 is prevented from leaping out.

Also, a structural member 60 protruding radially is provided above the seal member 51 located uppermost in the step portion 59 of the displacer 58, and a protrusion 61 protruding downward is provided outside the spring 54 fitted in the seal member 51 at the bottom surface of the structural member 60. Then, by these structural member 60 and protrusion 61, the spring 54 fitted in the seal member 51 located uppermost is prevented from leaping out.

In addition, the way in which the spring 54 in the seal member 51 located uppermost is prevented from leaping out by the bottom of the structural member 60 and the protrusion 61 can be applied to the way in which a spring used singly is prevented from leaping out.

Figure 6:
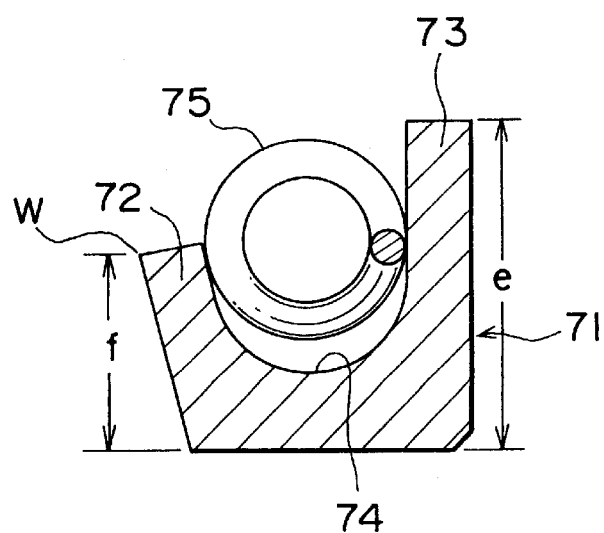
FIG. 6 is a sectional view of a seal ring different from those of FIGS. 1, 4 and 5.

In a seal member 71 shown in FIG. 6, height "f" of an outer circumferential wall 72 located outer than an annular groove 74 into which an annular spring 75 is fitted is shorter than height "e" of an inner circumferential wall 73 located inner than the annular groove 74. Then, the annular spring 75 is partly protruded from the end of the outer circumferential wall 72. Accordingly, the outer circumferential wall 72 will not press the whole spring 75 inward of the radial direction (i.e., the pressing force of the outer circumferential wall 72 against the spring 75 is relatively small), so that the repulsion force of the spring 75 will never be degraded. If the outer circumferential wall 72 and the inner circumferential wall 73 is of the same height, there is a possibility that the repulsion force of the spring 75 may be degraded, in which case the end portion W of the outer circumferential wall 72 would no longer exert the sealing function.

In addition, the sealing portion W is implemented by an upper end portion of the outer circumferential wall 72 in FIG. 6, but is not limited to this.

The seal members 41, 51, 55, 71 may be formed either from unsaturated polyester-PTFE or from other materials such as carbon-PTFE. Further, the spring may be implemented by any one, only if annular in shape, without being limited to coil springs.

Industrial Applicability

This cryo-refrigerator is suitable for use in communication machines, superconducting equipment and the like.

We claim:

1. A cryo-refrigerator comprising:
   a cylinder;
   a displacer which is reciprocatedly fitted into the cylinder and which has a regenerative chamber with a regenerative material accommodated therein;
   a seal member for forming a seal between an outer circumferential surface of the displacer and an inner circumferential surface of the cylinder; and
   an annular spring which is fitted into an annular groove opened in one direction along an axial direction of the seal member and which urges an outer circumferential wall of the seal member radially outward, wherein the seal member is formed from an unsaturated polyester-polytetrafluoroethylene in which the unsaturated polyester is present in a mixing ratio which satisfies the following relationship: 20%≦mixing ratio≦35%.

2. The cryo-refrigerator according to claim 1, wherein an outer circumferential surface in an outer circumferential wall of the seal member is convexly bent in an axial cross section, and a radial outer end portion of the bent convex portion forms a sealing portion, and wherein
   a slit extended axially and piercing through radially is provided in a portion of the outer circumferential wall nearer to opening of the annular groove than the sealing portion.

3. The cryo-refrigerator according to claim 1, wherein an outer circumferential surface of an outer circumferential wall of the seal member is convexly bent in an axial cross section, and a radial outer end portion of the bent convex portion forms a sealing portion, and wherein
   annular grooves are provided at at least one of the sealing portion of the outer circumferential wall and a site opposite to the sealing portion in an inner circumferential surface of the outer circumferential wall.

4. The cryo-refrigerator according to claim 1, wherein an outer circumferential surface of the outer circumferential wall of the seal member is inclined with respect to the axial direction in such a manner that a radius of the outer circumferential surface progressively increases toward one end of the axial direction, and an end portion of the outer circumferential wall forms a sealing portion;

a structural member protruding radially outward is provided on axial one side of the displacer beyond the position of the seal member;

a protrusion protruding toward the seal member is provided outside the spring in an end face of the structural member confronting the spring; and the spring fitted in the seal member is prevented from leaping out by the end face of the structural member and the protrusion.

5. The cryo-refrigerator according to claim 1, wherein the seal member is implemented by a plurality of seal members stacked in the same axial direction;

outer circumferential surfaces of the outer circumferential walls of the respective seal members are inclined with respect to the axial direction in such a manner that radii of the outer circumferential surfaces progressively increase toward one end of the axial direction, and an end portion of each outer circumferential wall forms a sealing portion;

a protrusion protruding downward is provided at the other axial end portion of the outer circumferential wall of the seal member on the one axial end side out of the seal members; and the spring fitted in the seal member located on the other axial end side is prevented from springing out by both the other axial end portion of the seal member located on the one axial end side and the protrusion.

6. The cryo-refrigerator according to claim 1, wherein a height of the outer circumferential wall of the seal member is shorter than a height of the inner circumferential wall, and wherein the spring is partly protruded from an end of the outer circumferential wall.

7. A cryo-refrigerator having: a cylinder; a displacer which is reciprocatedly fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, wherein an outer circumferential surface of the outer circumferential wall of the seal member is convexly bent in an axial cross section, and a radial outer end portion of the bent convex portion forms a sealing portion, and wherein a slit arranged axially and penetrating through radially is provided in a portion of the outer circumferential wall nearer to an opening of the annular groove than the sealing portion.

8. A cryo-refrigerator having: a cylinder; a displacer which is reciprocatedly fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, wherein an outer circumferential surface of an outer circumferential wall of the seal member is convexly bent in an axial cross section, and a radial outer end portion of the bent convex portion forms a sealing portion, and wherein annular grooves are provided at at least one of the sealing portion of the outer circumferential wall and a site opposite to the sealing portion in an inner circumferential surface of the outer circumferential wall (42).

9. A cryo-refrigerator having: a cylinder; a displacer which is reciprocatedly fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, wherein an outer circumferential surface of the outer circumferential wall of the seal member is inclined with respect to the axial direction in such a manner that a radius of the outer circumferential surface progressively increases toward one end of the axial direction, and an end portion of the outer circumferential wall forms a sealing portion;

a structural member protruding radially outward is provided on one axial side of the displacer beyond the position of the seal member;

the spring fitted in the seal member is prevented from springing out by the end face of the structural member and the protrusion.

10. A cryo-refrigerator having: a cylinder; displacer which is reciprocatedly fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, wherein the seal member is implemented by a plurality of seal members stacked in the same axial direction; outer circumferential surfaces of the outer circumferential walls of the respective seal members are inclined with respect to the axial direction in such a manner that radii of the outer circumferential surfaces progressively increase toward one end of the axial direction, and an end portion of each outer circumferential wall forms a sealing portion;

a protrusion protruding downward is provided at the other axial end portion of the outer circumferential wall of the seal member on the one axial end side out of the seal members; and the spring fitted in the seal member located on the other axial end side is prevented from springing out by both the outer axial end portion of the seal member located on the one axial end side and the protrusion.

11. A cryo-refrigerator having: a cylinder; a displacer which is reciprocatedly fitted into the cylinder and which has a regenerative chamber with a regenerative material accommodated therein; a seal member for sealing between an outer circumferential surface of the displacer and an inner circumferential surface of the cylinder; and an annular spring which is fitted into an annular groove opened in one direction along an axial direction of the seal member and which urges an outer circumferential wall of the seal member radially outward, wherein a height of the outer circumferential wall of the seal member is shorter than a height of the inner circumferential wall (73), and wherein the spring is partly protruded from an end of the outer circumferential wall.

* * * * *